United States Patent
Öhman (10) Patent No.: US 11,163,313 B2
(45) Date of Patent: Nov. 2, 2021

(54) METHODS FOR POSITIONING VEHICLES USING ELECTRIC ROAD SYSTEMS AND VEHICLES OPERATED USING THESE METHODS

(71) Applicant: VOLVO TRUCK CORPORATION, Gothenburg (SE)

(72) Inventor: Mikaela Öhman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 15/777,809

(22) PCT Filed: Dec. 18, 2015

(86) PCT No.: PCT/EP2015/080541
§ 371 (c)(1),
(2) Date: May 21, 2018

(87) PCT Pub. No.: WO2017/102029
PCT Pub. Date: Jun. 22, 2017

(65) Prior Publication Data
US 2018/0356833 A1    Dec. 13, 2018

(51) Int. Cl.
*G05D 1/02* (2020.01)
*B60L 53/35* (2019.01)
(Continued)

(52) U.S. Cl.
CPC .......... *G05D 1/0265* (2013.01); *B60L 5/005* (2013.01); *B60L 5/19* (2013.01); *B60L 5/36* (2013.01);
(Continued)

(58) Field of Classification Search
CPC .......... G05D 1/0265; G05D 2201/0213; Y02T 90/14; Y02T 90/125; Y02T 90/121;
(Continued)

(56) References Cited

U.S. PATENT DOCUMENTS 9,616,772 B2 *   4/2017   Hourtane ................... B60L 5/39
9,796,272 B2 *  10/2017   Richards ................. B60L 53/30
(Continued)

FOREIGN PATENT DOCUMENTS

AU         6199096 A      2/1998
CN      203267799 U     11/2013
(Continued)

OTHER PUBLICATIONS

International Search Report (dated Sep. 19, 2016) for corresponding International App. PCT/EP2015/080541.
(Continued)

*Primary Examiner* — Mathew Franklin Gordon
(74) *Attorney, Agent, or Firm* — Venable LLP; Jeffri A. Kaminski (57) ABSTRACT

A vehicle and a method for controlling a vehicle including a current collector transmitting electric power from a current conductor located in a predetermined position in the surface of a road a distance from one side of the road; a first detecting means generating a signal indicative of the position of the current collector relative to a current conductor reference point; where the current collector is displaceable to track the current conductor in response to the signal; and a second detecting means detecting the position of the current collector are provided. The method involves determining a first distance representing the position of the current collector relative to the current conductor reference point; determining a second distance representing the position of the current collector relative to a vehicle reference point; and determining a distance between the vehicle reference point and the current conductor reference point using the first and second distances to determine a current vehicle position on the road.

15 Claims, 8 Drawing Sheets

(51) Int. Cl.
 B60L 5/00 (2006.01)
 B60L 5/36 (2006.01)
 B60L 5/19 (2006.01)
 B60L 53/36 (2019.01)
 B60L 53/126 (2019.01)
(52) U.S. Cl.
 CPC ............ *B60L 53/126* (2019.02); *B60L 53/35* (2019.02); *B60L 53/36* (2019.02); *B60L 2260/32* (2013.01); *G05D 2201/0213* (2013.01); *Y02T 10/70* (2013.01); *Y02T 10/7072* (2013.01); *Y02T 90/12* (2013.01); *Y02T 90/14* (2013.01)
(58) Field of Classification Search
 CPC ............ Y02T 10/7072; Y02T 10/7005; B60L 2260/32; B60L 5/36; B60L 5/19; B60L 5/005; B60L 53/36; B60L 53/35; B60L 53/12
 See application file for complete search history.

(56) References Cited

U.S. PATENT DOCUMENTS

| | | | | |
|---|---|---|---|---|
| 2005/0283699 | A1* | 12/2005 | Nomura | G01C 21/32 714/746 |
| 2013/0025989 | A1 | 1/2013 | Asplund | |
| 2014/0095006 | A1* | 4/2014 | Saito | B60L 5/045 701/22 |
| 2015/0291048 | A1* | 10/2015 | Ichikawa | B60L 53/36 701/22 |
| 2016/0090007 | A1* | 3/2016 | Buehs | B60L 5/045 191/33 R |
| 2017/0129342 | A1* | 5/2017 | Tajima | B60L 5/39 |

FOREIGN PATENT DOCUMENTS

| | | |
|---|---|---|
| CN | 103547473 A | 1/2014 |
| CN | 103596799 A | 2/2014 |
| CN | 104169121 A | 11/2014 |
| DE | 102011076615 A1 | 11/2012 |
| EP | 0950558 A1 | 10/1999 |
| EP | 1582396 A1 | 10/2005 |
| EP | 2644432 A2 | 10/2013 |
| EP | 2923882 A1 | 9/2015 |
| WO | 2011046403 A2 | 4/2011 |
| WO | 2012143161 A2 | 10/2012 |

OTHER PUBLICATIONS

China Office Action dated Mar. 2, 2021 in corresponding China Patent Application No. 201580085382.5, 23 pages.

* cited by examiner

METHODS FOR POSITIONING VEHICLES USING ELECTRIC ROAD SYSTEMS AND VEHICLES OPERATED USING THESE METHODS

BACKGROUND AND SUMMARY

The invention relates to a method for positioning a vehicle using an electric road system (ERS) and a vehicle operated using this method.

The invention can be applied in vehicles, such as trucks, buses, cars and construction equipment. Although the invention will be described with respect to a commercial vehicle, the invention is not restricted to this particular vehicle, but may also be used in heavy-duty vehicles such as working machines in the form of articulated haulers.

Vehicles travelling on an electric road system (ERS) are provided with a current collector arranged to transmit electric power from a current conductor located in the road surface to the vehicle for driving the vehicle or for charging an electrical storage means, such as a high voltage battery onboard the vehicle. The current conductor is a charging surface that can comprise a pair of parallel tracks extending along the electric road, which tracks can supply direct current (DC) to the vehicle via the current collector.

Vehicles of this type can be provided with tracking means to allow the current collector to track and follow the current conductor. The vehicle can be steered by a driver who will need to maintain a relatively steady course along the road, as the tracking means has a limited transverse displacement range. This requires the driver to concentrate on lane keeping which can be tiresome and tedious over a longer distance. Alternatively the vehicle can be steered by a suitable autonomous lane keeping means to maintain a desired course along the electric road. A problem with this type of lane keeping means is that it may occasionally lose track of the lane, due to missing lane markers or other suitable means for tracking the lane. Hence the driver cannot relax completely even with the lane keeping means in operation, but must be ready to take over control at short notice to maintain a central lane position.

The invention aims to overcome problems relating to positioning of the vehicle relative to a charging surface of the ERS and provide suitable means for supporting the driver in maintaining a desired lane position.

It is desirable to provide a method for positioning a vehicle using an electric road system and a vehicle operated using this method.

In the subsequent text the wording "electric road system" will be described by the abbreviation ERS. An ERS can encompass a conductive system or an inductive system. Conductive systems require direct contact between a conductor comprising two parallel rails and a corresponding collector in order to transfer DC power. Inductive systems uses electro-magnetic transmission coils embedded in the road surface and reception coils in the vehicle which coils are electrically resonant, so that they convert the magnetic flux above the road into electrical energy for use in the vehicle, wherein the energy can be used to charge batteries or drive electric motors in the vehicle.

In the text, the wording "current collector" is used as a collective term for an arrangement that is suitable for transferring electrical power from a source of electrical energy in or on a road surface. A current collector of this type comprises a pick-up or a similar device arranged to be placed in close proximity to or in contact with a current conductor. The pick-up is attached to the vehicle via a controllable assembly that allows the pick-up to be vertically and transversely displaced relative to the vehicle. The displacement can be achieved, for instance, by an arm that can be pivoted vertically about a horizontal pivot joint towards the road surface and transversely in an arc about a vertical pivot joint, or by a holder displaced vertically along a first guide and transversely about a second guide mounted transversely to the vehicle. Consequently, when it is stated that the current collector is displaced to track a current conductor, this intended to mean that the arrangement is displaced to allow the pick-up component of the current collector to be placed in close proximity to or in contact with a current conductor.

The invention involves using the ERS pick-up positioning system for collecting vehicle positioning data. The positioning data ran be used for controlling a driver support function such as a dynamic steering system, a driver alert system, a lane keeping system or an autonomous driving system. The position data can further be used for plausibility evaluation for verifying position data from other systems or sensor, or be used as a back-up for these systems or sensors. The invention further involves an autonomous driving system for an ERS as described above. In particular, the system can be used for autonomous driving in connection with loading/unloading operations, also termed "marshalling", in ferry or train terminals or for parking the vehicle in a predetermined position.

According to a first aspect of the invention, a method is provided for controlling a vehicle, which vehicle comprises a current collector arranged to transmit electric power from a current conductor located in a predetermined position in the surface of a road, which predetermined position is located a set lateral distance from one side of the road. The vehicle further comprises at least one first detecting means located adjacent the current collector and arranged to generate a signal indicative of the position of the current collector relative to a current conductor reference point. The current collector is arranged displaceable relative to the vehicle to track the current conductor in response to the generated signal. The vehicle also comprises at least one second detecting means for detecting the position of the current collector relative to the vehicle.

The method involves continuously performing the steps of:

determining a first distance representing the position of the current collector relative to the current conductor reference point in the transverse direction of the vehicle;

determining a second distance representing the position of the current collector relative to a vehicle reference point in the transverse direction of the vehicle; and determining a distance between the vehicle reference point and the current conductor reference point in the transverse direction of the vehicle using the first and second distances, in order to determine a current vehicle position on the road.

In an ERS the current conductor is preferably arranged along a straight or substantially straight road segment. When laying down the electrical conductor or rails making up a current conductor it is preferable to use a set or a standard lateral distance for positioning the current collector in or on the road surface. This position is preferably, but not necessarily located along the centre line of the road or lane. In order to simplify laying and to ensure that the current conductor is following the road or lane, a predetermined or a standard lateral distance relative to a delimiting side edge of the road or large will be used. If a standardized distance is used then this distance can be pre-programmed in a vehicle controller or an electronic control unit. Alternatively the lateral distance information can be provided to the electronic control unit via a GPS signal or be signposted at the start of an ERS road to allow manual data input by the driver.

A method which comprises the above steps provides the advantage of allowing the distance between one delimiting edge or position of a road or lane and a reference position on the vehicle to be determined exactly using the predetermined position of the current conductor. Consequently the vehicle can be controlled, either autonomously or by the driver, to follow the road or lane with improved accuracy using the distance data provided by the method.

According to one example, the at least one first detecting means located adjacent the current collector can be a suitable proximity sensor, such as a magnetic, inductive or capacitive sensor. One or more sensors of this type can be arranged on or adjacent the pick-up of the current collector in order to detect the position of the current conductor. In this example the accuracy is determined by the type of sensor, the number of sensors and/or the proximity of the sensor(s) to the current conductor during tracking and current transfer. An advantage with this type of proximity sensors is that the sensors are robust and relatively inexpensive and can be used to detect the position of the current conductor directly.

According to a further example, the at least one first detecting means located adjacent the current collector is a coil or antenna suitable for detecting the magnetic field surrounding a signal wire transmitting alternating current (AC). In this case an antenna on or adjacent the pick-up can be used to detect a signal wire arranged in the road surface parallel to the current conductor. Such a signal wire can be located in a central location relative to the current conductor, e.g. coinciding with a conductor reference point between two parallel rails making up the conductor, or a predetermined or standardized lateral distance from the current conductor reference point in the transverse direction of the vehicle. The vehicle can be provided with a signal receiver arranged to receive signals from the signal wire or transmitter transmitting a signal having predetermined phase characteristics. The use of a suitable signal, such as a continuous or repeated intermittent asymmetric pulse train having predetermined phase characteristics, allows the distance and the relative lateral position of the antenna relative to the signal wire to be determined. As the distance between the signal wire and the conductor reference point is known, the position of the current collector relative to the current conductor can be determined. In this way the above-mention first distance can be determined.

An advantage of this method, which involves the transmission and detection of a signal having predetermined phase characteristics, is that it is possible to detect not only the exact position of the electrical conductor but also the direction from which a detecting antenna is approaching the electrical conductor. An additional advantage is that the method allows the electrical conductor to be detected and tracked using a minimum of detectors, as a single vertical antenna is sufficient for detecting and tracking the electrical conductor.

As described above, the method involves determining a distance between a predetermined vehicle reference point and a predetermined current conductor reference point in the transverse direction of the vehicle in order to determine a current vehicle position on the road. The method further involves using the current vehicle position on the road for controlling a vehicle steering assist system in response to the determined distance, in order to maintain the vehicle in a desired position on the road.

The method outlined above can be used for controlling the steering assist system in response to the determined distance if the determined distance exceeds a predetermined limit. This allows a driver assist system to use the method for maintaining the vehicle in a desired lateral position relative to the current conductor and/or the lane in which the vehicle is travelling. In this way the driver can concentrate on the surrounding traffic instead of having to continuously correct the lateral position of the vehicle in the ERS lane.

The method can also be used for controlling the steering assist system in response to the determined distance, in order to guide the vehicle into a desired position during a parking, reversing or marshalling operation. This allows a driver assist system to use the method for following a predetermined path of powered segments of the ERS to move the vehicle into a desired position.

The method can also be used for providing a manually controlled steering assist system wherein a driver notification signal is generated in response to the above-mentioned determined distance if the determined distance exceeds a predetermined limit. This allows the driver to concentrate on the surrounding traffic while maintaining a desired lateral position of the vehicle in the ERS lane. If the vehicle deviates from the desired position then the driver receives an audible, a visual and/or a haptic warning signal indicating that a steering correction is required. The driver notification signal can provide information about the level of urgency as well as the required direction of a steering correction.

According to a further example, the method can involve comparing the determined current vehicle position with input signals from at least one additional in-vehicle forward looking data collection system to verify the vehicle position. An in-vehicle forward looking data collection system can comprise one or more of e.g. a radar or lidar system, a laser system, an ultrasonic system, a camera system, or a similar suitable data collection system for use in a vehicle collision avoidance system or a lane keeping system. An advantage of this example is that the data for the current vehicle position on the road determined by the method can be used in combination with or instead of data determined by other in-vehicle systems. For instance, if a lane keeping system indicates that a vehicle in an adjacent lane is too close to the host vehicle then a temporary lateral repositioning of the host vehicle may be required. The current vehicle position data can be monitored in combination with the lane keeping system to ensure that the vehicle does not go outside the ERS lane.

According to a further example, the method can involve comparing the determined current vehicle position with one or more input signals from at least one additional in-vehicle forward looking data collection system as indicated above. The comparison can be used to validate the function of said additional system. The position determined by the method is very accurate as the lateral position of the current conductor is standardized or a fixed value. The output signal from a forward looking data collection system can therefore be validated and if necessary calibrated using the current vehicle position determined by the method.

According to a further example, the method can involve using the determined current vehicle position instead of input signals from at least one additional in-vehicle forward looking data collection system if the validation fails. For instance, if a lane keeping system fails then the current vehicle position data can be used as a back-up to maintain a desired lane position at least while the vehicle is travelling on an ERS road.

According to a second aspect of the invention, a vehicle is provided as described below. According to one embodiment, the vehicle comprises a current collector arranged to transmit electric power from a current conductor located in a predetermined lateral position in the surface of a road on which the vehicle is travelling. The current conductor is located a set lateral distance from one delimiting side or boundary of the road. The vehicle further comprises at least one first detecting means located adjacent the current collector and arranged to generate a signal indicative of the position of the current collector relative to a current conductor reference point. As indicated above, the at least one first detecting means located adjacent the current collector is a suitable proximity sensor, such as a magnetic, inductive or capacitive sensor. One or more sensors of this type can be arranged on or adjacent the pick-up of the current collector in order to detect the position of the current conductor. In this example the accuracy is determined by the number of sensors and/or the proximity of the sensor(s) to the current conductor during tracking and current transfer. The current collector is arranged displaceable relative to the vehicle to flack the current conductor in response to the generated signal. At least one second detecting means is provided for detecting the position of the current collector relative to the vehicle.

The vehicle also comprises an electronic control unit is arranged to monitor signals from the first detecting means, representing the position of the current collector relative to the current conductor reference point in the transverse direction of the vehicle. The electronic control unit is arranged to monitor signals from the second detecting means, representing the position of the current collector relative to a vehicle reference point in the transverse direction of the vehicle. The electronic control unit is arranged to determine a distance between the vehicle reference point and the current conductor reference point in the transverse direction of the vehicle based on the signals from the first and second detecting means, in order to determine a current vehicle position on the road.

The advantage of this arrangement is that the distance between one delimiting edge or position of a road or lane and a reference position on the vehicle can be determined exactly using the known position of the current conductor. Consequently the vehicle can be controlled, either autonomously or manually by the driver, to follow the road or lane with improved accuracy using the distance data provided.

As described above, the at least one first detecting means located adjacent the current collector can be a suitable proximity sensor, such as a magnetic, inductive or capacitive sensor. One or more sensors of this type can be arranged on or adjacent the pick-up of the current collector in order to detect the position of the current conductor. The accuracy is determined by the type of sensor, the number of sensors and/or the proximity of the sensor(s) to the current conductor during tracking and current transfer. An advantage with this type of proximity sensors is that the sensors are robust and relatively inexpensive and can be used to detect the position of the current conductor directly.

According to a further example, the at least one first detecting means located adjacent the current collector is a coil or antenna suitable for detecting the magnetic field surrounding a signal wire transmitting alternating current (AC). In this case an antenna on or adjacent the pick-up can be used to detect a signal wire arranged in the road surface parallel to the current conductor. Such a signal wire can be located in a central location relative to the current conductor, e.g. coinciding with a conductor reference point between two parallel rails making up the conductor, or a predetermined or standardized lateral distance from the current conductor reference point in the transverse direction of the vehicle. The vehicle can be provided with a signal receiver arranged to receive signals from the signal wire or transmitter transmitting a signal having predetermined phase characteristics. A suitable signal for this purpose can be a continuous or repeated intermittent asymmetric pulse train having predetermined phase characteristics, which allows the distance and the relative lateral position of the antenna relative to the signal wire to be determined. As the distance between the signal wire and the conductor reference point is known, the position of the current collector relative to the current conductor can be determined. In this way the above-mention first distance can be determined.

An advantage of this arrangement, which involves the transmission and detection of a signal having predetermined phase characteristics, is that it is possible to detect not only the exact position of the electrical conductor but also the direction from which a detecting antenna is approaching the electrical conductor. An additional advantage is that the arrangement allows the electrical conductor to be detected and tracked using a minimum of detectors, as a single vertical antenna is sufficient for detecting and tracking the electrical conductor.

According to a further example the electronic control unit is arranged to control a steering assist system in response to the determined distance between the predetermined vehicle reference point and the predetermined current conductor reference point, in order to maintain the vehicle in a desired position on the road. This allows a driver assist system to use the arrangement for maintaining the vehicle in a desired lateral position relative to the current conductor and/or the lane in which the vehicle is travelling. In this way the driver can concentrate on the surrounding traffic instead of having to continuously correct the lateral position of the vehicle in the ERS lane.

According to one alternative example the second detecting means is a linear sensor arranged to detect the position of a transversely displaceable current collector relative to a reference point on the vehicle. The current collector cart be displaced in the vertical and transverse directions by suitable linear actuators, such as one or more pneumatic, hydraulic or electric actuators or motors.

According to a second alternative example the second detecting means is an angle sensor arranged to detect the angular position of a pivotable arm supporting the current collector. The current collector can be displaced in the transverse direction by an actuator pivoting the arm about a vertical axis and in the vertical direction by an actuator pivoting the arm about a horizontal axis. Suitable actuators for this purpose are one or more pneumatic, hydraulic or electric actuators or motors.

According to a third aspect of the invention, a computer program comprising program code means for performing the method steps as described above, when said program is run on a computer is provided. The invention further relates to a computer readable medium carrying a computer program comprising program code means for performing the method steps described above when said program product is run on a computer. Finally, the invention relates to a control unit for controlling an electrical storage system, the control unit being configured to perform the method steps described above.

The invention provides a method and a vehicle comprising an arrangement for improving the positioning of a vehicle travelling on an ERS road, in particular for driver assistance and for autonomous driving but also for assisting manual operation of the vehicle. The arrangement can be used in combination with other driver assist systems, for supporting or backing up such systems or for verifying the function of other vehicle based systems for determining the vehicle position.

Further advantages and advantageous features of the invention are disclosed in the following description and in the dependent claims.

BRIEF DESCRIPTION OF THE DRAWINGS

In the following text, the invention will be described in detail with reference to the attached drawings. These schematic drawings are used for illustration purposes only and do not in any way limit the scope of the invention.

In the drawings.

DETAILED DESCRIPTION

Figure 1A:
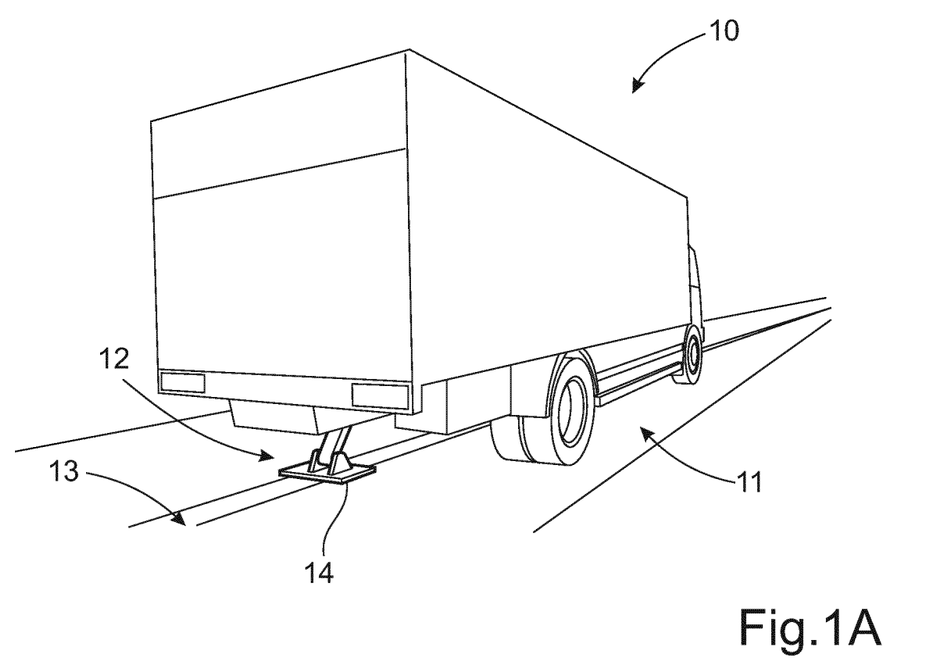
FIG. 1A shows a schematic electric road system according to the invention.

FIG. 1A shows a schematic electric road system (ERS) where a vehicle 10 is travelling on a mad 11 provided with means for supplying electric current to the vehicle 10. The vehicle 10 is provided with a power collecting arrangement 12 which can be lowered into contact with a current conductor 13 located in the surface of the road 11. The vehicle can be an electric vehicle or a hybrid electric vehicle.

The power collecting arrangement 12 comprises a current collector 14 arranged to be displaced between a retracted, inactive first position and an operative second position in contact with the current conductor 13 using suitable actuators (not shown). FIG. 1A shows the current collector in its operative position. Positioning means is provided for moving the current collector 14 at least in the vertical direction of the vehicle.

In this context the positioning means will be described as a displaceable arm or holder for the current collector, which arm can be displaced vertically either in a straight line or in an arcuate path relative to a pivot with a horizontal axis on the vehicle. The positioning means for such an arm can also comprise actuator means for displacing the arm in the transverse direction of the vehicle, either in a straight line or in an arcuate path relative to a pivot with a vertical axis on the vehicle. Alternatively, the transverse positioning means can comprise suitable control means connected to an electronically controllable steering system in the vehicle, wherein lateral positioning of the vehicle relative to the electrical conductor can be performed using a pair of steerable wheels. Positioning can further be performed using a combination of the above means, for instance if the vehicle must be displaced in the lateral direction to bring the current conductor within the transverse range of the displaceable arm carrying the current collector. The design of the power collecting arrangement will not be described in further detail here.

Figure 1B:
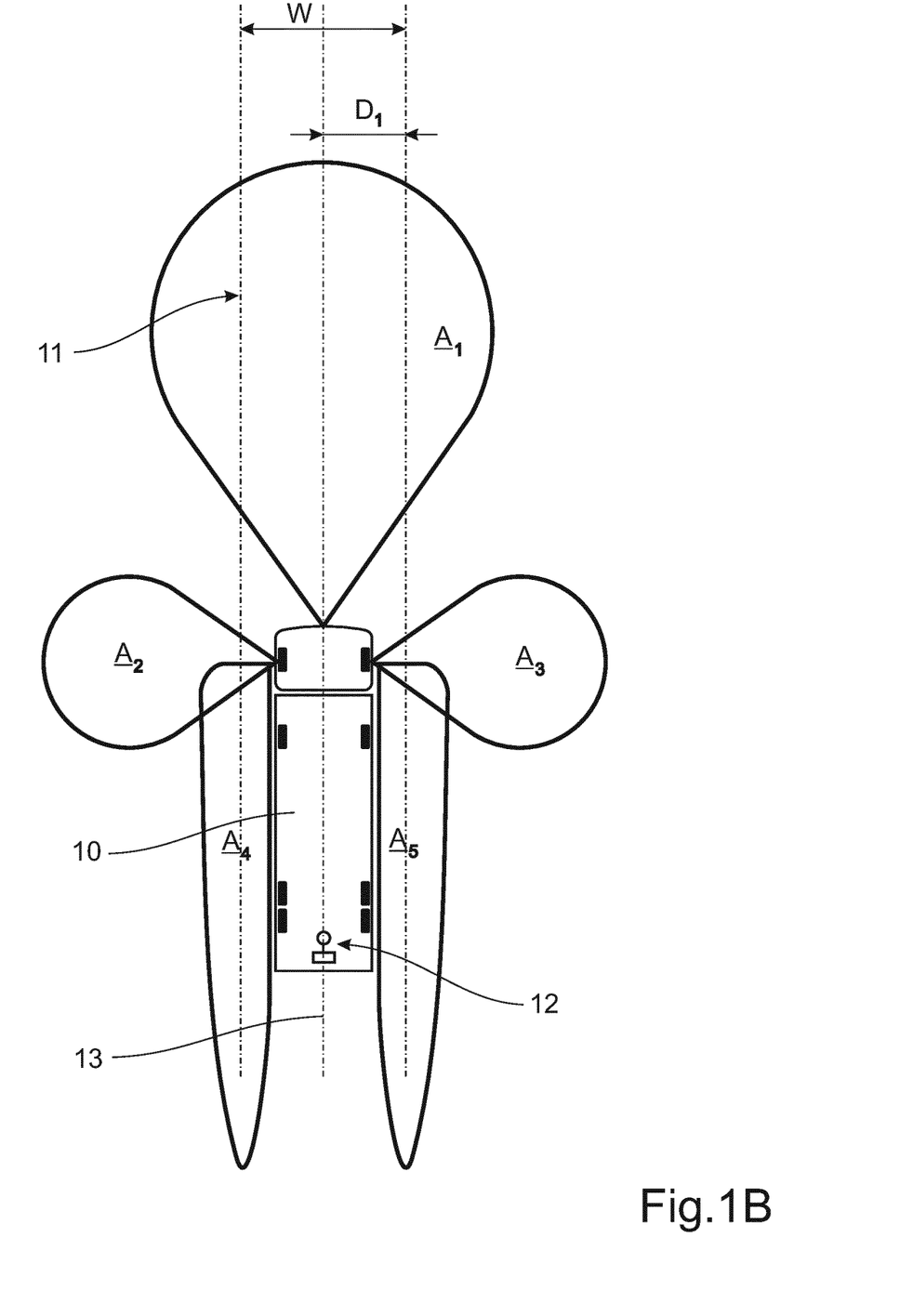
FIG. 1B shows a schematic plan view of the vehicle in FIG. 1A.

FIG. 1B shows a schematic plan view of the vehicle in FIG. 1A. The figure illustrates the vehicle 10 with the power collecting arrangement 12 which can be lowered into contact with the current conductor 13 located in the surface of the road 11. The road 11 has a width W and the current conductor 13 is located in a predetermined position in the surface of the road 11, a set lateral distance D1 from one side edge of the road 11. The vehicle 10 is provided with an in-vehicle forward looking data collection system comprising multiple sensors, such as a forward looking sensor array covering an area A1 in front of the vehicle, side sensors covering areas A2, A3 in the lateral direction and rearward looking sensor arrays covering areas A4, A5 to the rear of the vehicle. Suitable sensors for this purpose are, e.g. a radar or lidar system, a laser system, an ultrasonic system, a camera system, or a similar suitable data collection system for use in a vehicle collision avoidance system or a lane keeping system.

Figure 2:
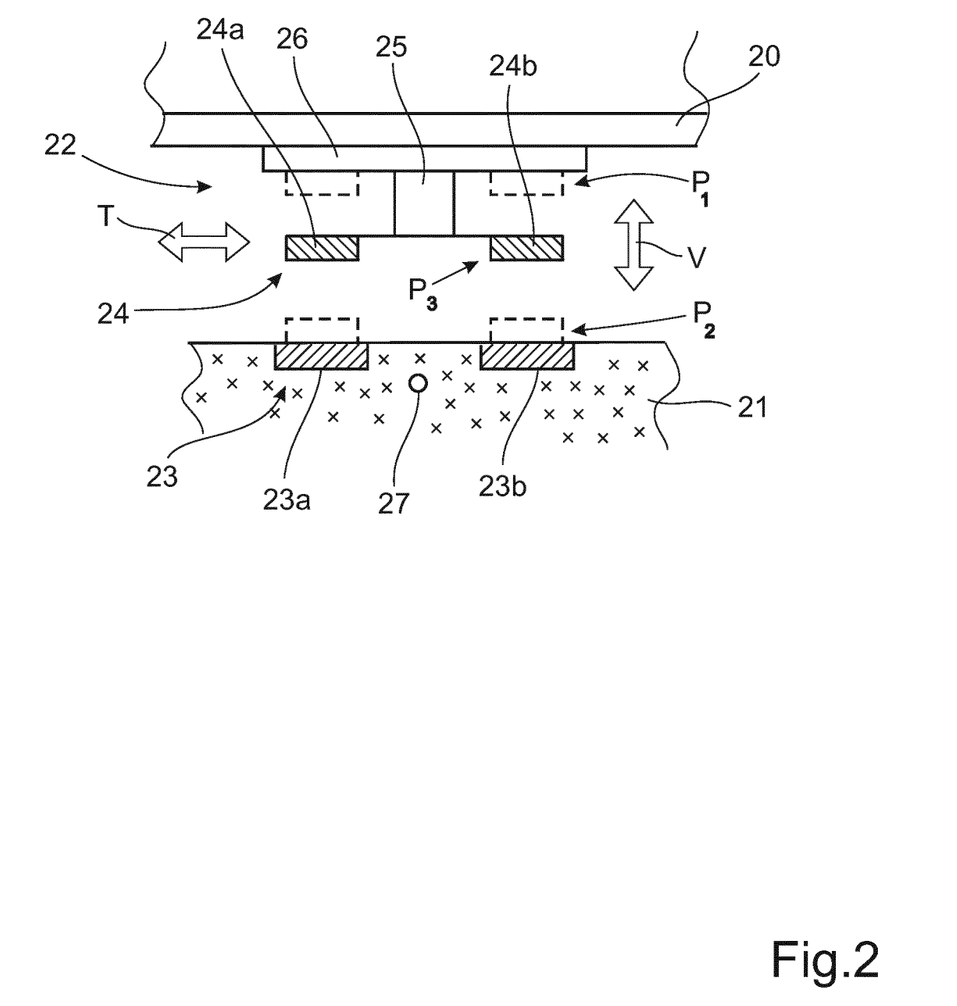
FIG. 2 shows a schematic front view of a power collecting arrangement according to the invention.

FIG. 2 shows a schematic from view of a power collecting arrangement 22 according to one example of the invention. The power collecting arrangement 22 is mounted on a schematically indicated vehicle 20 located over a schematic section of a road 21. A current conductor 23 comprising a first and a second power rail 23a, 23b for supplying DC current is located in the surface of the road 21. The power collecting arrangement 22 comprises a current collector 24 with a first and a second contactor 24a, 24b for collecting current from the respective first and a second power rails 23a, 23b. The current collector 24 is attached to a vertical positioning means 25 for displacing the current collector 24 from a retracted first position P1 adjacent the vehicle 20 to an active second position P2 in contact with the current conductor 23. The vertical displacement is indicated by the arrow V. The lowering of the current collector 24 into the active, second position is performed when it is detected that the first and second contactors 24a, 24b are vertically aligned with their respective first and second power rails 23a, 23b.

In FIG. 2 the current collector 24 is shown in an optional intermediate position P3. The current collector 24 can be displaced vertically to the intermediate position P3 between the first and second positions P1, P2 in order to locate the current conductor 23 prior to lowering the current collector 24 into the second position P2. Alternatively the current collector can be displaced in a continuous movement from the first position, past the intermediate position, and into the second position.

In the example shown in FIG. 2, the current collector 24 and the vertical positioning means 25 are attached to a transverse positioning means 26. The vertical positioning means 26 is arranged to displace the current collector 24 and the vertical positioning means 25 in the transverse direction of the vehicle 20 as indicated by the arrow T. The transverse positioning means 26 is controlled to displace the current collector 24 in the transverse direction of the vehicle 20, initially to locate and subsequently to track the current conductor 23. Tracking is performed to maintain the first and second contactors 24a, 24b in vertical alignment with their respective first and second power rails 23a 23b. According to the example in FIG. 2, locating and tracking the current conductor 23 is performed by using one or more vertical antennas (see FIGS. 3A-3C) used for detecting the position of a signal cable 27 located between or adjacent the current conductor 23. However, the invention is not limited to this method of locating the current conductor, as will be described below.

An alternative power conducting system can be a current conductor comprising inductive loops buried in the road surface which loops would generate a magnetic field to supply the vehicle with energy without the need for a contacting current collector. This contactless transfer of energy is enabled by an electric current flowing through the conductor to generate a magnetic field. In the case of an alternating current (AC), this induces a voltage in a second conductor on the vehicle, even though the two conductors are not in contact with one another. Using precisely controlled frequencies of the applied alternating current, high-efficiency energy transmission from the sending to the receiving electrical circuits is ensured. The principles for locating an inductive current conductor would be substantially the same as for the power rail arrangement described in connection with FIG. 2.

Figure 3A:
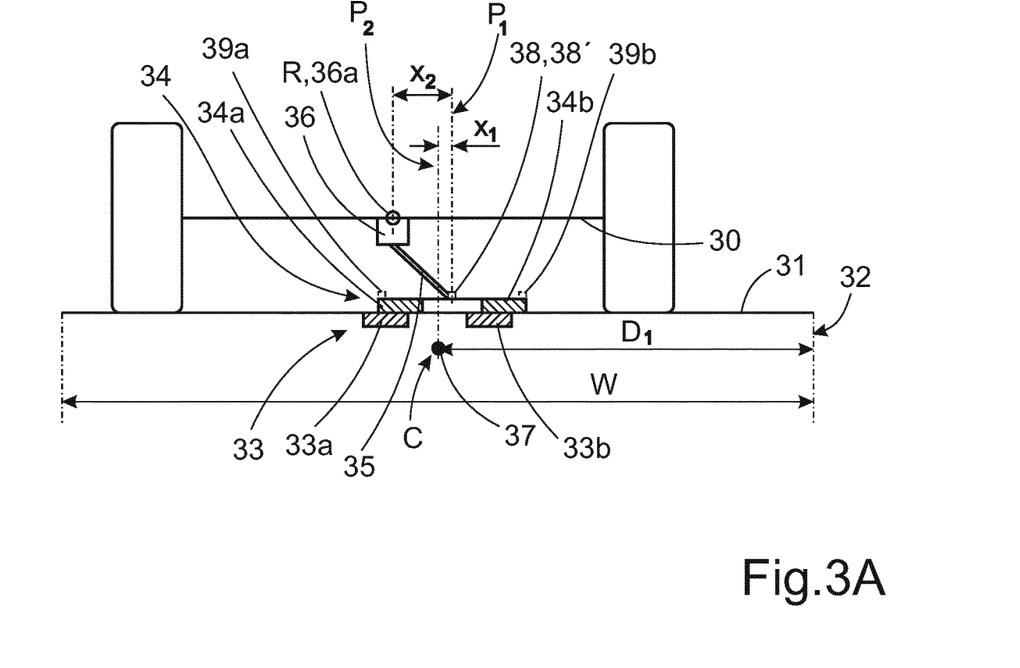
FIGS. 3A-E show alternative embodiments of the position determining method according to the invention
Figure 3B:
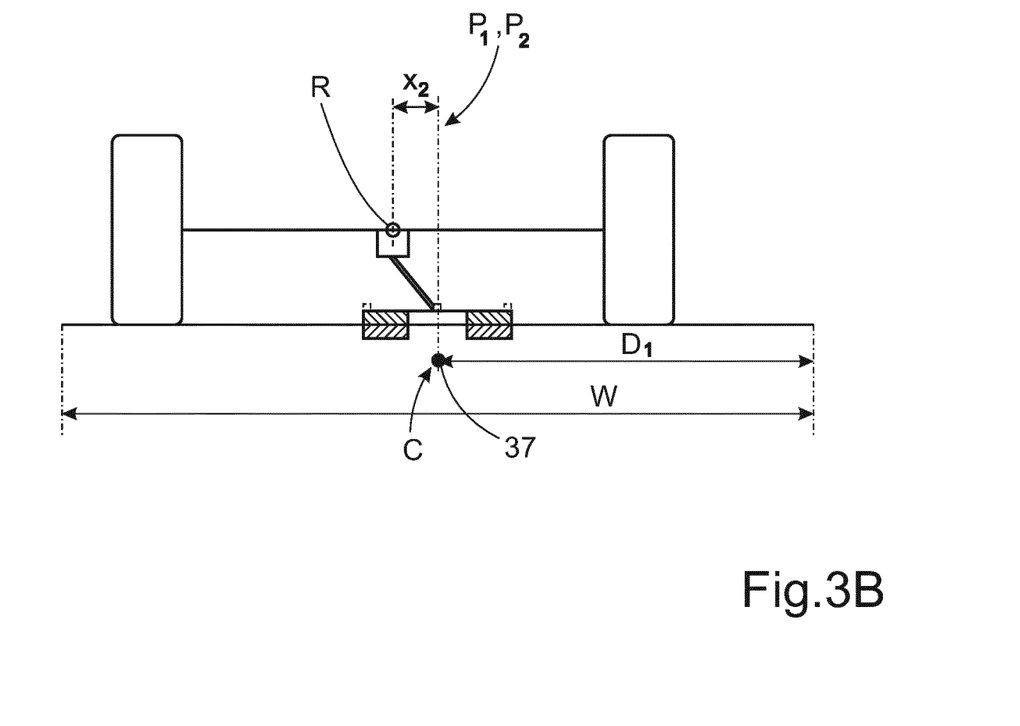
Figure 3C:
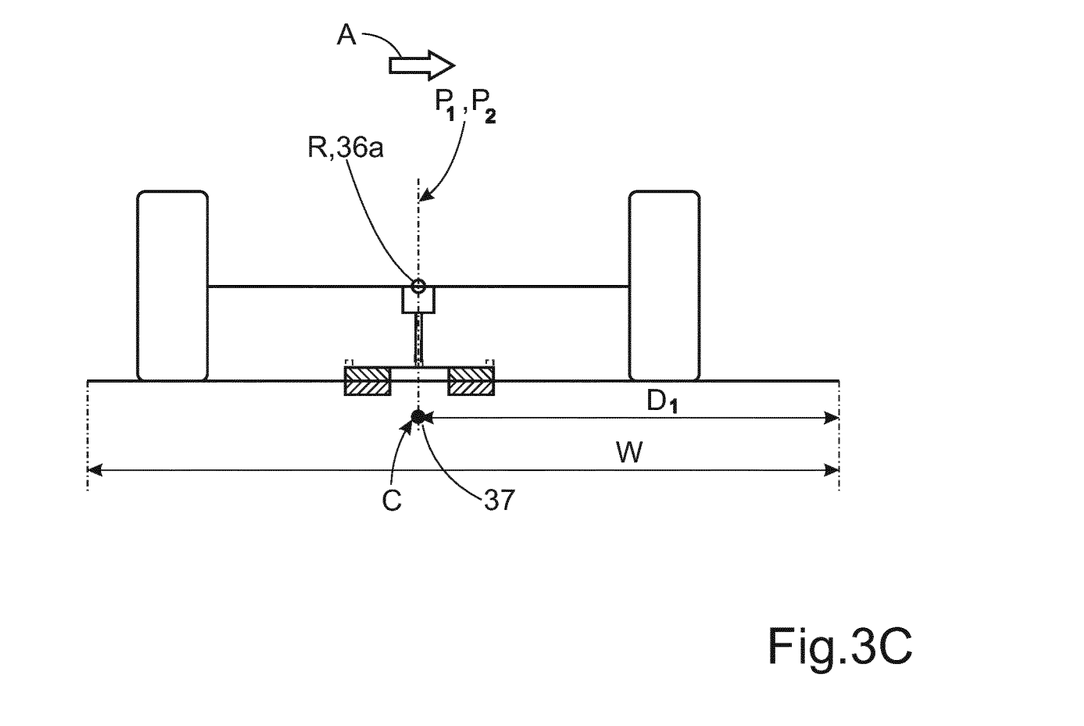

FIGS. 3A-3C describe a first embodiment of a position determining method according to the invention. FIG. 3A shows a schematically indicated vehicle 30 provided with a current collector 34, 35, 36 comprising a pick-up 34 attached to an arm 35, which arm 35 is mounted to the vehicle 30 via a vertical pivot joint 36. Displacement of the pick-up 34 can be achieved by pivoting the arm 35 vertically about a horizontal pivot joint towards the road surface and transversely in an arc about the vertical pivot joint 36 using suitable actuators (not shown). The pick-up 34 comprises two parallel contacts 34a, 34b arranged to transmit electric power from a current conductor 33 comprising two parallel power rails 33a, 33b. The current conductor 33 has a central reference point C located in a predetermined position in the surface of a road 31 having a width W, a set lateral distance D1 from one side edge 32 of the road 31. In this example the central reference point C is centered between the parallel power rails 33a, 33b.

A first detecting means 38 is located adjacent the current collector 34 and is arranged to generate a signal indicative of the position of the current collector 34 relative to the reference point C of the current conductor 33. The current collector 34, 35, 36 is arranged displaceable relative to the vehicle to track the current conductor 33 in response to the generated signal. A second detecting means 36a is arranged to detect the position of the current collector 34, 35, 36 relative to a reference point R on the vehicle. In this example the second detecting means 36a is centered between the parallel contacts 34a, 34b.

The inventive method involves continuously performing the steps of:

determining a first distance X1 representing a position P1 of the current collector 34, 35, 36 relative to the current conductor reference point C in the transverse direction of the vehicle, by means of the first detecting a means 38;

determining a second distance X2 representing the position P1 of the current collector 34, 35, 36 relative to a vehicle reference point R in the transverse direction of the vehicle, by means of the second detecting means 36a; and determining a distance between the vehicle reference point R and the current conductor reference point C in the transverse direction of the vehicle using the first and second distances X1, X2, in order to determine a current vehicle position on the road.

According to a first example, FIG. 3A shows a first detecting means 38 in the form of a single antenna suitable for detecting the magnetic field surrounding a signal wire transmitting alternating current (AC). For increased accuracy and/or sensor range, multiple antennas can be used. In this case the antenna 38 on the pick-up 34 is a vertical coil used to detect a signal wire 37 arranged in a position P2 in the road surface parallel to and coinciding with the reference point C of the current conductor 33. The vehicle is provided with a signal receiver (see FIG. 4) arranged to receive signals from the signal wire or transmitter transmitting a signal having predetermined phase characteristics, which allows the distance and the relative lateral position of the antenna relative to the signal wire to be determined. As the distance between the signal wire 37 and the conductor reference point C is zero (positions C and P2 are coinciding), the position P1 of the current collector relative to the current conductor 33 can be determined by the first detecting means 38. In this way the first distance X1 is determined. Subsequently the second distance X2 representing the position P1 of the current collector 34, 35, 36 relative to the vehicle reference point R in the transverse direction of the vehicle, is determined by means of the second detecting means 36a comprising an angular sensor. FIG. 3A shows a case where the position P1 of the current collector 34, 35, 36 and the position of the vehicle reference point R are on opposite sides of the conductor reference point C. The offset between the vehicle reference point R and the conductor reference point C is therefore equal to (X2−X1).

FIG. 3B describes one possible example of a suitable correction of the positions of the vehicle 30 and the current collector 34 relative to the current conductor 33 based on the initial determination of the distance between the vehicle reference point R and the current conductor reference point C. As it is desirable to ensure that the pick-up 34 is centered over the current conductor 33 in order to avoid wear on the contacts and to ensure optimum power transmission, centering of the pick-up is prioritized. This can be achieved by a displacement of the arm 35 or by a simultaneous displacement of the arm 35 and the vehicle 30 into the position shown in FIG. 3B, where the position P1 of the current collector 34, 35, 36 coincides with the conductor reference point C. Subsequently the distance X2 between the vehicle reference point R and the current conductor reference point C is recalculated. The vehicle can then be centered in the lane by simultaneous displacement of the arm 35 and the vehicle 30 in the direction of the arrow A into a position where the reference points C, R coincide, as shown in FIG. 3C.

According to a second example, FIG. 3A shows an alternative first detecting means 38', 39a, 39b in the form of an array of proximity sensors. In FIG. 3A three proximity sensors are indicated, but this number can be increased depending on the type of sensor used and the desired accuracy of the array. Suitable proximity sensors for this purpose are magnetic, inductive or capacitive sensors.

The sensor array making up the alternative first detecting means 38', 39a, 39b is used to detect the relative position between the current collector 34 and the current conductor 33 in a similar way to the first example described above. In this case the first detecting means 38', 39a, 39b are used to detect the position of the pick-up 34 relative to each of the power rails 33a, 33b in the road surface in order to determine the location of the reference point C of the current conductor 33. The position P1 of the current collector relative to the current conductor 33 can then be determined which in turn allows the first distance X1 to be determined. Subsequently the second distance X2 representing the position P1 of the current collector 34, 35, 36 relative to the vehicle reference point R in the transverse direction of the vehicle, is determined by means of the second detecting means 36a comprising an angular sensor. As stated above, FIG. 3 shows a case where the position P1 of the current collector 34, 35, 36 and the position of the vehicle reference point R are on opposite sides of the conductor reference point C. The offset between the vehicle reference point R and the conductor reference point C is therefore equal to (X2−X1). Once these distances and the relative positions have been determined, the current collector and/or the vehicle can be maneuvered into a desired position in the lane as described above in connection with FIGS. 3B and 3C.

Figure 3D:
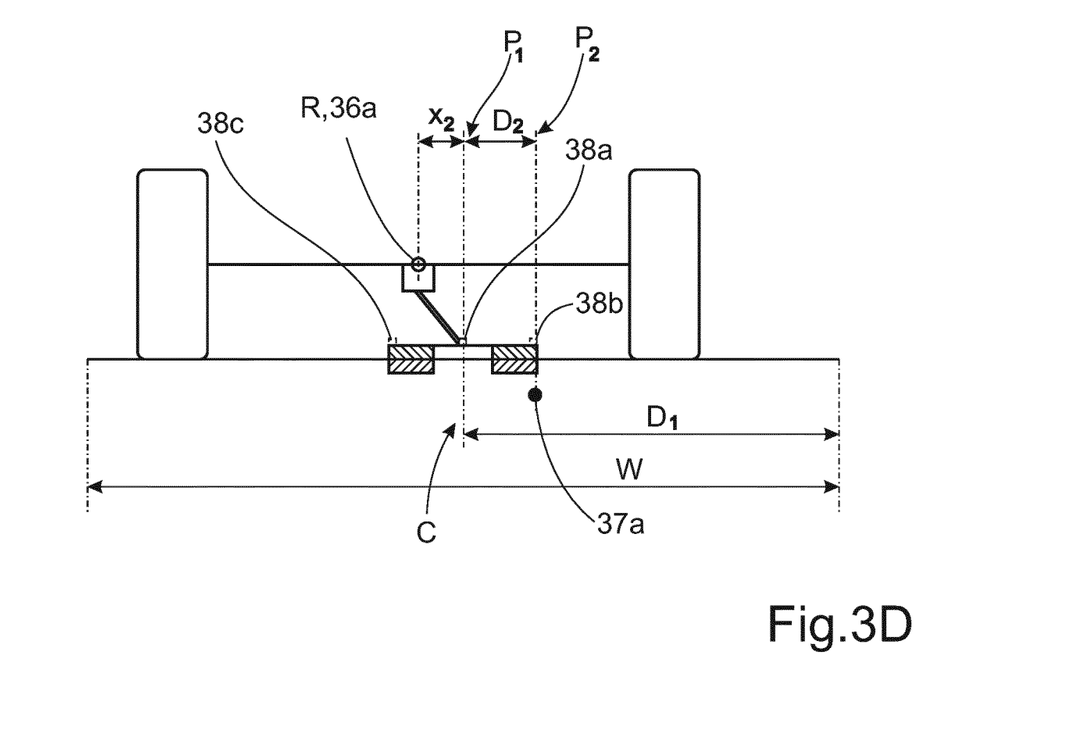
Figure 3E:
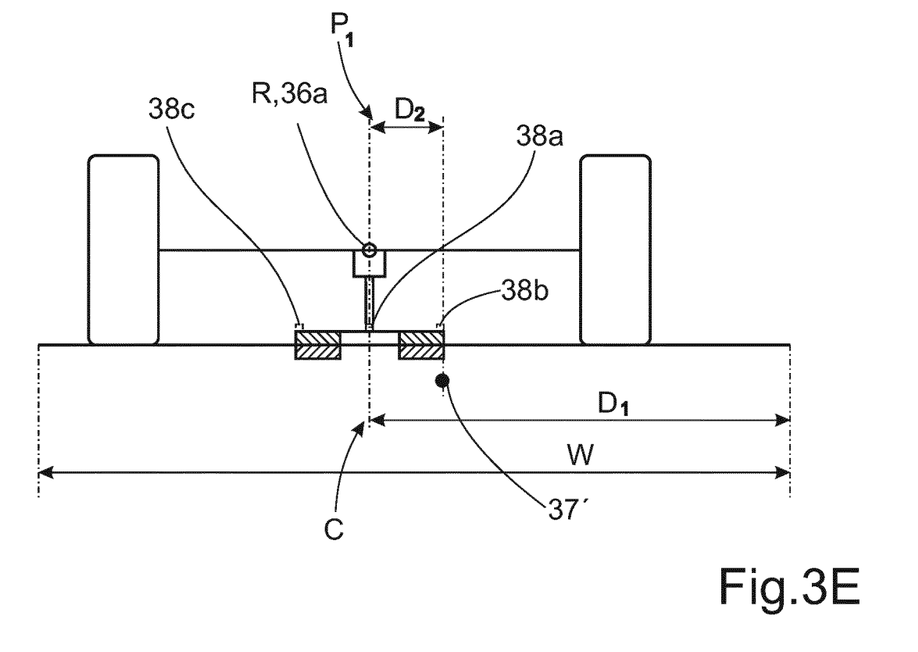

According to a third example, FIG. 3D shows a first detecting means 38a, 38b, 38c in the form of an antenna array suitable for detecting the magnetic field surrounding an offset signal wire transmitting alternating current (AC). In this case the antenna array 38a, 38b, 38c on the pick-up 34 comprises vertical coils used to detect a signal wire 37a arranged in a position P2 in the road surface parallel to and offset a distance D2 from the reference point C of the current conductor 33. The vehicle is provided with a signal receiver (see FIG. 4) arranged to receive signals from the signal wire 37a or transmitter transmitting a signal having predetermined phase characteristics, which allows the distance and the relative lateral position of the antenna array 38a, 38b, 38c relative to the signal wire 37a to be determined. As the distance between the signal wire 37a and the conductor reference point C is equal to a known, fixed distance D2, the position P of the current collector relative to the current conductor 33 can be determined by the first detecting means 38a, 38b, 38c. In this way the first distance X1 can be determined. In FIG. 3D the current collector 34 is already centered over the current conductor 33, so that the first distance X1 is zero. Subsequently the second distance X2 representing the position P1 of the current collector 34, 35, 36 relative to the vehicle reference point R in the transverse direction of the vehicle, is determined by means of the second detecting means 36a comprising an angular sensor. As FIG. 3D shows a case where the position P1 of the current collector 34, 35, 36 coincides with the conductor reference point C, the offset between the vehicle reference point R and the conductor reference point C is equal to X2. Once these distances and the relative positions have been determined, the current collector and/or the vehicle can be maneuvered into a desired centered position in the lane as shown in FIG. 3E. This maneuvering has been described above in connection with FIGS. 3B and 3C.

The current vehicle position on the road is then continuously monitored and a vehicle steering assist system is controlled in response to the determined distance between the vehicle reference point R and the current conductor reference point C, in order to maintain the vehicle in a desired position on the road. Alternatively, if the vehicle is steered manually the driver receives an audible, a visual and/or a haptic warning signal indicating that the vehicle has deviated a predetermined distance from the desired position and that a steering correction is required.

Figure 4:
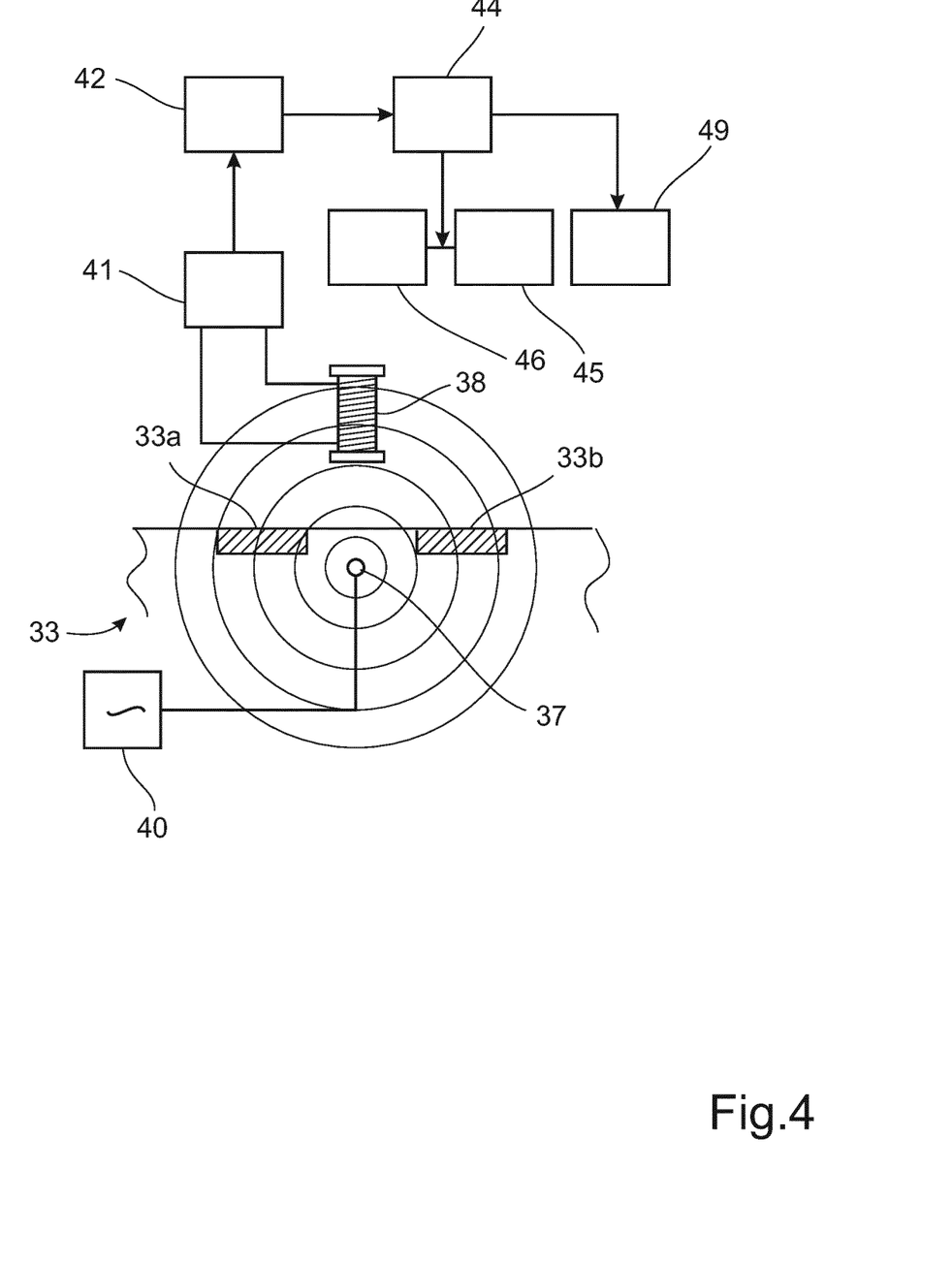
FIG. 4 shows a schematic diagram of a control arrangement for controlling a positioning means according to the invention.

FIG. 4 shows a schematic diagram of a control arrangement for controlling a positioning means as described above for locating and tracking a first and a second power rail 33a, 35b. The control arrangement comprises a first detecting means 38 in the form of a vertical antenna that is preferably mounted at a suitable location on or adjacent a current collector 34, 35, 36, for instance on the pick-up 34 (see FIGS. 3A-3E). FIG. 4 shows a single vertical antenna 38, but multiple antennas or proximity sensors could be used to form a sensor array having increased accuracy and/or range. The vertical antenna 38 is connected to a signal receiver 41 for detecting a signal induced into the vertical antenna 38.

An output signal from the signal receiver 41 is transmitted to an electronic control unit (ECU) 42, which is arranged to process the output signal and generate control signals to a position controller 44. The position controller 44 is arranged to determine at least the required displacement to be performed by a vertical actuator 45 and a transverse actuator 46 in order to move the current collector into alignment with the first and second power rails 33a, 33b of the current conductor.

According to an alternative example, the transverse actuator 36 can be eliminated or supplemented by an optional vehicle steering actuator 49. The vehicle steering actuator 49 can be used instead of the transverse actuator 46 for moving the vehicle in the transvers direction of the current conductor. According to a further alternative example, the vehicle steering actuator 49 can be used together with the transverse actuator 46 for autonomous lateral movement of the vehicle if the current conductor 33 is not within the displaceable range of the transverse actuator 46 and/or for maintaining a desired lateral position on the road. According to a further alternative example, the vehicle is steered manually whereby the driver can receive an audible, a visual and/or a haptic warning signal from the ECU 44 indicating that the vehicle has deviated a predetermined distance from the desired position and that a steering correction is required.

In operation the vertical antenna 38 will monitor the presence or absence of a predetermined signal transmitted from a signal cable 37 located in the road at a predetermined location relative to the first and second power rails 33a, 33b. The signal is generated by a signal generator 40 connected to the signal cable 37 and has a predetermined signal characteristics. When the vertical antenna 38 is within range the signal will be induced into the vertical antenna 38 and detected by the signal receiver 41. In response to the detected signal transmitted from the receiver to the ECU 42, the ECU 42 will determine if the current collector should be deployed, lowered into its active position or be retracted. The output from the signal receiver 31 contains data relating to signal strength and amplitude, as well as the phase characteristics of the signal which data is continuously processed by the ECU 32. In response to the received signal data the ECU 32 transmits control signals to the position controller 34, which determines the required displacement for each of the vertical and the transverse actuators 36 35 for maintaining the current collector in lateral alignment with the current conductor. When the signal ceases, for instance at the end of an ERS road, the ECU 32 will transmit a signal to the position controller 34 to actuate the vertical actuator 35 and retract the current collector.

The present invention also relates to a computer program, computer program product and a storage medium for a computer all to be used with a computer for executing the method as described in any one of the above examples.

Figure 5:
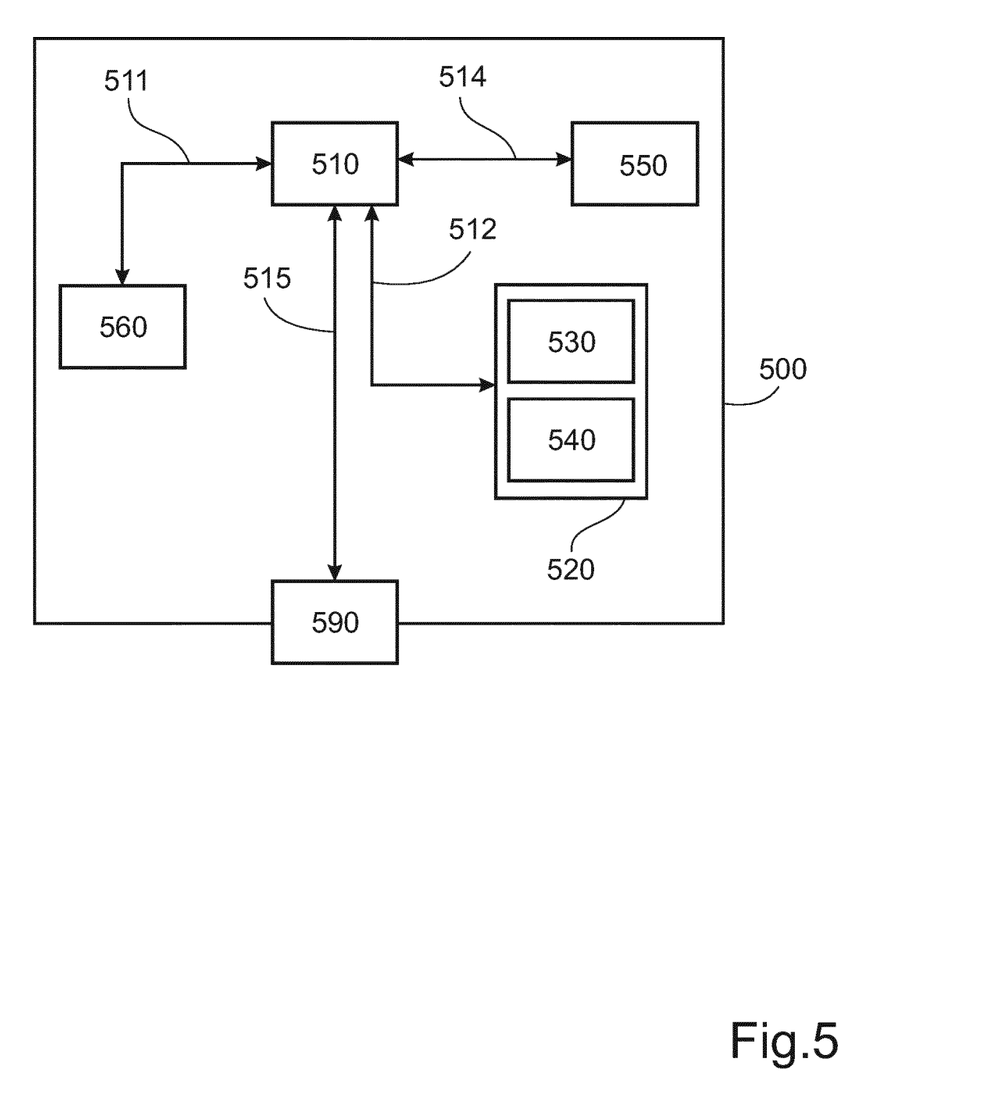
FIG. 5 shows the invention applied on a computer arrangement.

FIG. 5 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 42. The data-processing unit 510 can comprise, for example, a microcomputer. The memory 520 also has a second memory part 540, in which a program for controlling the vehicle according to the invention is stored. In an alternative embodiment, the program for controlling the vehicle is stored in a separate nonvolatile storage medium 550 for data, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the non-volatile storage medium 550.

The data-processing unit 510 is tailored for communication with the storage memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile storage medium 550.

It is to be understood that the present invention is not limited to the embodiments described above and illustrated in the drawings; rather, the skilled person will recognize that many changes and modifications may be made within the scope of the appended claims.

The invention claimed is:

1. Method for controlling a vehicle, the vehicle comprising;
a current collector arranged to transmit electric power from a current conductor located in a predetermined position (C) in the surface of a road, a lateral distance (D1) from one side edge of the road;
at least one antenna located adjacent the current collector and arranged to monitor the presence or absence of a signal from a signal cable located in the road at a predetermined location relative to the current conductor and to generate a signal indicative of the position of the current collector relative to the predetermined location of the signal cable, wherein the current collector is arranged displaceable relative to the vehicle to track the current conductor in response to the generated signal; and
at least one second detecting means for detecting the position of the current collector relative to the vehicle;
means for setting the lateral distance (D1) from the one side edge of the road to the predetermined position in the surface of the road,
wherein the method comprising continuously performing the steps of:
determining a first distance (X1) representing a position (P1) of the current collector relative to the predetermined location of the signal cable in the transverse direction of the vehicle;
determining a second distance (X2) representing a position (P2) of the current collector relative to a vehicle reference point (R) in the transverse direction of the vehicle; and
determining a distance between the vehicle reference point (R) and the predetermined location of the signal cable in the transverse direction of the vehicle using the first and second distances (X1, X2), in order to determine a current vehicle position on the road relative to the one side edge of the road.

2. Method according to claim 1, comprising controlling a vehicle steering assist system in response to the determined distance, in order to maintain the vehicle in a desired position on the road.

3. Method according to claim 2, comprising controlling the steering assist system in response to the determined distance if the determined distance exceeds a predetermined limit.

4. Method according to claim 2, comprising controlling the steering assist system response to the determined distance, in order to guide the vehicle into a desired position during a parking, reversing, or marshalling operation.

5. Method according to claim 1, comprising generating a driver notification signal in response to the determined distance if the determined distance exceeds a predetermined limit.

6. Method according to claim 1, comprising comparing the determined current vehicle position with input signals from at least one additional in-vehicle forward looking data collection system to verify the vehicle position.

7. Method according to claim 1, comparing the determined current vehicle position with input signals from at least one additional in-vehicle forward looking data collection system to validate the function of additional system.

8. Method according to claim 7, comprising using the determined current vehicle position instead of input signals from at least one additional in-vehicle forward looking data collection system if the validation fails.

9. A vehicle comprising;
a current collector arranged to transmit electric power from a current conductor located in a predetermined lateral position (C) in the surface of a road, a lateral distance (D1) from one side edge of the road;
at least one antenna located adjacent the current collector and arranged to monitor the presence or absence of a signal from a signal cable located in the road at a predetermined location relative to the current conductor and to generate a signal indicative of the position of the current collector relative to the predetermined location of the signal cable, wherein the current collector is arranged displaceable relative to the vehicle to track the current conductor in response to the generated signal;
at least one second detecting means (38; 39a, 39b) for detecting the position of the current collector;
wherein
an electronic control unit is arranged to set the lateral distance (D1) from the one side edge of the road to the predetermined position (C) in the surface of the road;
the electronic control unit is arranged to monitor signals from the at least one antenna, representing the position (P1) of the current collector relative to the predetermined location of the signal cable in the transverse direction of the vehicle;
the electronic control unit is arranged to monitor signals from the second detecting means (38; 39a, 39b), representing the position (P1) of the current collector relative to a vehicle reference point (R) in the transverse direction of the vehicle; and
the electronic control unit is arranged to determine a distance between the vehicle reference point (R) and the predetermined location of the signal cable in the transverse direction of the vehicle based on the signals from the at least one antenna and the second detecting means, in order to determine a current vehicle position on the road relative to the one side edge of the road.

10. A vehicle according to claim 9, wherein the electronic control unit is arranged to control a steering assist system (43) in response to the determined distance, in order to maintain the vehicle in a desired position on the road.

11. A vehicle according to claim 9, wherein the second detecting means is a linear sensor arranged to detect the position of a transversely displaceable current collector.

12. A vehicle according to claim 9, wherein the second detecting means is an angle sensor arranged to detect the angular position of a pivotable arm supporting the current collector.

13. A computer comprising a computer program for performing the steps of claim 1 for determining the position of a vehicle on a road when program is run on the computer.

14. A non-transitory computer readable medium carrying a computer program for performing the steps of claim 1 for determining the position of a vehicle on a road when program product is run on a computer.

15. A control unit for determining the position of a vehicle on a road, the control unit being configured to perform the steps of the method according to claim 1.

* * * * *